United States Patent [19]

Hillemeier et al.

[11] Patent Number: 4,804,563
[45] Date of Patent: Feb. 14, 1989

[54] METHOD AND APPARATUS FOR THE SPRAY PLACING OF CONCRETE LAYERS

[75] Inventors: Bernd Hillemeier, Wiesbaden; Günter Brockmann, Bad Homburg; Richard Pohl, Mörfelden-Walldorf, all of Fed. Rep. of Germany

[73] Assignee: Hochtief Aktiengesellschaft Vorm. Gebr. Helfmann, Essen, Fed. Rep. of Germany

[21] Appl. No.: 14,009

[22] Filed: Feb. 12, 1987

[30] Foreign Application Priority Data

Feb. 13, 1986 [DE] Fed. Rep. of Germany ....... 3604486

[51] Int. Cl.$^4$ .............................................. B05D 1/12
[52] U.S. Cl. .................................. 427/397.7; 427/426; 427/427
[58] Field of Search ................ 239/433; 427/426, 427, 427/397.7

[56] References Cited

U.S. PATENT DOCUMENTS

| 4,239,397 | 12/1980 | Sandell | 427/426 X |
| 4,263,346 | 4/1981 | Sandell | 427/426 X |
| 4,292,351 | 9/1981 | Ito et al. | 427/426 |

FOREIGN PATENT DOCUMENTS 2020722 11/1979 United Kingdom .

*Primary Examiner*—Shrive Beck
*Attorney, Agent, or Firm*—Herbert Dubno

[57] ABSTRACT

A spray concrete composition which is sprayed with driving-air pressure has its setting time accelerated by incorporation in the driving air of amorphous silica dust having an inner surface (specific surface area) of at least 25 m$^2$/g.

9 Claims, 2 Drawing Sheets

METHOD AND APPARATUS FOR THE SPRAY PLACING OF CONCRETE LAYERS

FIELD OF THE INVENTION

Our present invention relates to a method of and an apparatus for the placement of concrete and, more particularly, to a method of and an apparatus for the spray placement of a concrete layer on a surface to be coated with concrete.

BACKGROUND OF THE INVENTION

It is known in connection with subterranean galleries or tunnels to coat the excavated wall with a layer of concrete, to protect ducts and the like with concrete coating and in general to provide a surface to be concreted with a coating of the flowable concrete mixture which ultimately hardens to form a concrete layer on this surface.

The concrete generally consists of hydraulic cement, an aggregate, a filler which is usually a more finely divided mineral matter than the aggregate which can be gravel or crushed rock, additives of various kinds, e.g. metal fibers or synthetic resins serving to reinforce or reduce the density of the concrete mass, or materials serving to accelerate setting or otherwise control the setting time, and water in a permeable and sprayable concrete mixture.

In current practice, the concrete mixture is pumped to a spray head which has a nozzle from which a jet of the concrete can emerge and which is equipped with means connecting that nozzle to a source of compressed air, also referred to as driving air, which assists in propelling the composition in the form of a spray from the nozzle and permits the particles of that spray to collect on the surface to be coated or concreted.

The concrete pump supplies the flowable concrete mixture at a predetermined volume flow rate to the nozzle and the driving air source supplies the driving air at a pressure of generally several bars to the nozzle.

When reference is made herein to a filler, we intend to so identify finely divided fillers commonly used in spray concretes, especially fly ash. As noted, the additives when they are used, can be setting accumulators or setting retarders. They can include synthetic resins or even synthetic resin components which can polymerize in situ to serve to modify the structure of the applied concrete or to promote some favorable characteristic or reduce some unfavorable characteristic of the hardenable composition.

A reference to the driving pressure herein will be understood to mean the static pressure of the driving air supplied by the compressed air source and delivered to the inlet for the driving air of the spray head and thus the static pressure at the entry to the latter.

While such systems have been used in the past to considerable advantage, both the methods and the apparatuses which have been employed leave much to be desired. For example, the setting time is relatively high. To render the composition both permeable and sprayable, it is frequently necessary to include in the composition excess water, i.e. water which does not participate in the hydration reaction which the concrete composition undergoes for setting. The excess water has been found to delay the setting time and this, in turn, has an adverse influence on the thickness in which the composition can be applied in a single spray pass and on the overall thickness of the concrete layer which be applied to surface.

To reduce the setting time, it is known to admix water glass. to the concrete composition and this is generally done upon make up of the original composition.

Water glass, however, has the drawback that it is an additive which promotes a chemical hardening process which must be superimposed on the usual hydration reaction which the composition is to undergo. It tends to raise the pH value of the fresh concrete significantly above its normal pH of 12.6 and to promote undesirable alkali silicate reactions which tend to reduce the strength of the setting concrete as a function of time, i.e. limits the fast-hardening strength of the concrete.

From United Kingdom patent specification No. 2,020,722 it is known to add silica dust to a spray concrete composition.

Silica dust is defined as a dust-fine particulate of amorphous or colloidal silica which is usually fabricated as precipitation silicic acid or by high temperature hydrolysis and can be distinguished because of its amorphous character from crystalline sands otherwise known as quartz sands or silica sands.

In this system, the cement composition in the form of a flowable mixture of the hydraulic cement, possibly fine-grained fillers and water, can be latter mixed with the dry aggregate. The silica dust is introduced into the flowable mixture. The early contact of the silica dust with water and the long time between the introduction of the silica dust into the mixture and emplacement of the concrete here practically ensures that no significant effect of the adsorption heat will contribute to promotion of a setting reaction. Indeed the reference does not even mention internal surface area or specific surfaces of the silica dust.

As a consequence, the silica powder does not materially affect the setting time although it does contribute to an increased strength of the setting concrete. Presumably the silica powder reacts with calcium hydroxide of the composition to form calcium silicate hydrates which favorably affect the crystal structure of the concrete when it is set.

OBJECTS OF THE INVENTION

It is, therefore, the principal object of the present invention to provide an improved method of coating surfaces to be concreted with spray concrete whereby drawbacks of prior art methods are obviated.

A more specific object of our invention is to provide an improved method for the application of spray concrete to a surface which will reduce the setting time without generating in the concrete detrimental chemical reactions and thus will promote greater thicknesses of concrete to be applied in a single pass, and in general, greater thicknesses of spray concrete to be formed into concrete coatings upon a surface.

It is an object of this invention to provide an improved device or apparatus for applying spray concrete to a surface.

SUMMARY OF THE INVENTION

These objects and others which will become more readily apparent hereinafter are attained, in accordance with the present invention in a method of applying spray concrete to a surface to be concreted which comprises forming a preamble and sprayable concrete composition consisting at least of a hydraulic cement, an aggregate and water, pumping that composition to a spray nozzle, entraining the composition from the spray nozzle in driving air to spray particles of the composition onto the surface and charging the driving air with silica dust with an internal surface (specific surface) of at least 25 m²/g and in an amount sufficient to cause, upon contact of the driving air with the composition, by the generation at least in part of adsorption heat, a spontaneous temperature increase of the composition of at least several degrees Kelvin.

The amorphous silica dust may react with the concrete in the course of setting as has been previously described, but in the method in which it is combined with the concrete composition, i.e. in entrainment with the driving air, it, at the specific surface area recited, generates a spontaneous temperature increase which promotes the setting reaction as the concrete composition reaches the surface to the point that thicker layers can be applied in a single pass and the thickness of the layer ultimately applied can be markedly increased over earlier techniques in which silica dust is not added in the drive air or is added to the flowable composition before it meets the driving air.

In accordance with the present invention, moreover, it appears that the absorption or adsorption of the excess water which is provided to ensure sprayability of the composition also eliminates the water from contributing a setting-retarding effect as is common in earlier methods.

Practically all of the excess water can be taken up in the silica dust practically at the moment that the dust meets the concrete composition and as it travels to and accumulates on the surface to be coated.

Since the amorphous silica powder is entrained in the driving air, its mixture with the composition is effected directly upon spraying or immediately prior to spray discharge from the nozzle.

It will be understood that effective practice of the invention requires an intimate mixing of the driving air with the composition. For this reason the silicic acid forming the silica dust or powder should have the smallest possible particle size. Hence the smallest particle size in which this material is commercially available may be satisfactory for the purposes of the invention. It should be noted that the externally small particles of the silica dust appear to form crystallization nuclei for the concrete whose presence accelerates setting and stiffening and the formation of silicate hydrates.

Hence the particles not only contribute absorption and adsorption heat to the system, but by promoting the chemical reaction for the formation of calcium silicate hydrates, generate reaction heat as part of the setting process.

According to the invention, sufficient amorphous silica powder or dust is added in the driving air so that the desired degree of acceleration of the stiffening or reduction of the setting time is obtained. The amount of silica dust can vary within a reasonably wide range and can be 2 to 6% by weight of the hydraulic cement component which is delivered from the nozzle. For example, if the composition is sprayed at a rate such that the hydraulic cement component thereof is delivered in a quantity by weight of C per minute, the dust should be applied via driving air at a rate by weight of 0.2 C/min to 0.6 C/min.

The spray concrete of the invention undergoes the strength increase upon hardening characteristic of the addition of the silica dust in the U.K. patent mentioned previously.

Advantageously, the quantity of the silica dust which is added should be sufficient to raise the temperature of the sprayed composition spontaneously by 5° to 10° Kelvin and this usually corresponds to 2 to 6% by weight of the hydraulic cement component for the most customary spray concrete compositions. Preferably the amount of the amorphous silica dust which is added should correspond to 4% by weight of the hydraulic cement component of the composition. This amount has been found to provide an optimum generation of heat.

In a preferred embodiment of the invention, the driving air is charged at the driving pressure with the silica dust, this having been found to avoid the formation of flakes or clumps of the silica powder.

While we have indicated that the minimum internal surface or specific surface area of the amorphous silica dust should be 25 m²/g, significantly higher specific surfaces are preferred. For example, it has been found to be particularly advantageous to use a silica dust with an internal surface between 200 and 300 m²/g, inclusive, although we can use silica dusts with specific surfaces up to 700 m²/g and more. Of course, the greater the inner surface, the smaller may be the quantity of the amorphous silica dust which is added.

It has been found to be advantageous in some cases to add conventional finely divided concrete setting accelerators to the silica dust so that, for example, of the mixture of the silica dust and such accelerators (taken as 100%), 25 to 40% by weight of the accelerators can be added to the silica dust before the silica dust is introduced into the driving air.

The invention can operate with all conventional spray concrete mixtures including those which contain synthetic resin components and a typical mixture which has been found to be most effective consists essentially of 300 kg/m³ hydraulic cement, 80 kg/m³ fly ash, 1600 kg/m³ aggregate long sieve line $B_8/C_8$ and 200 kg/m³ water. The cement is preferably Portland cement 45F.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
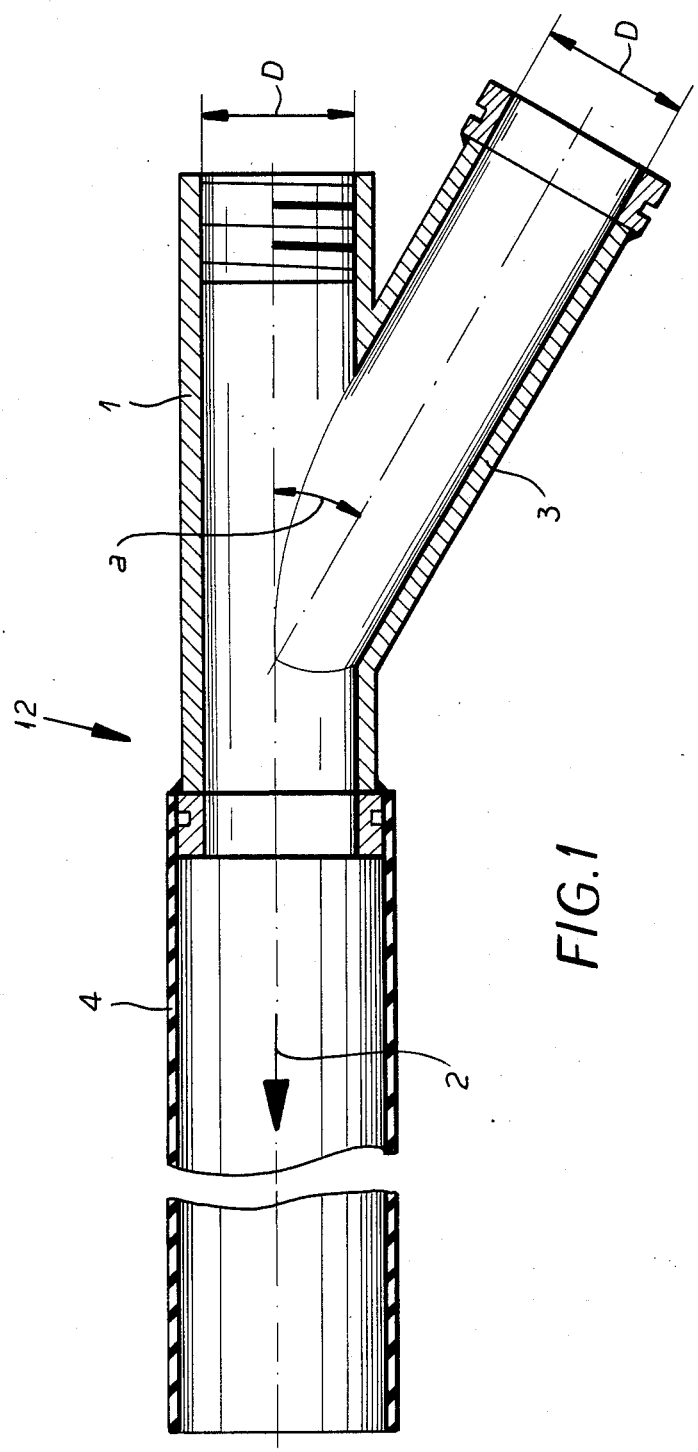
FIG. 1 is a cross sectional view through a portion of a spray head utilizing the principles of this invention.
Figure 2:
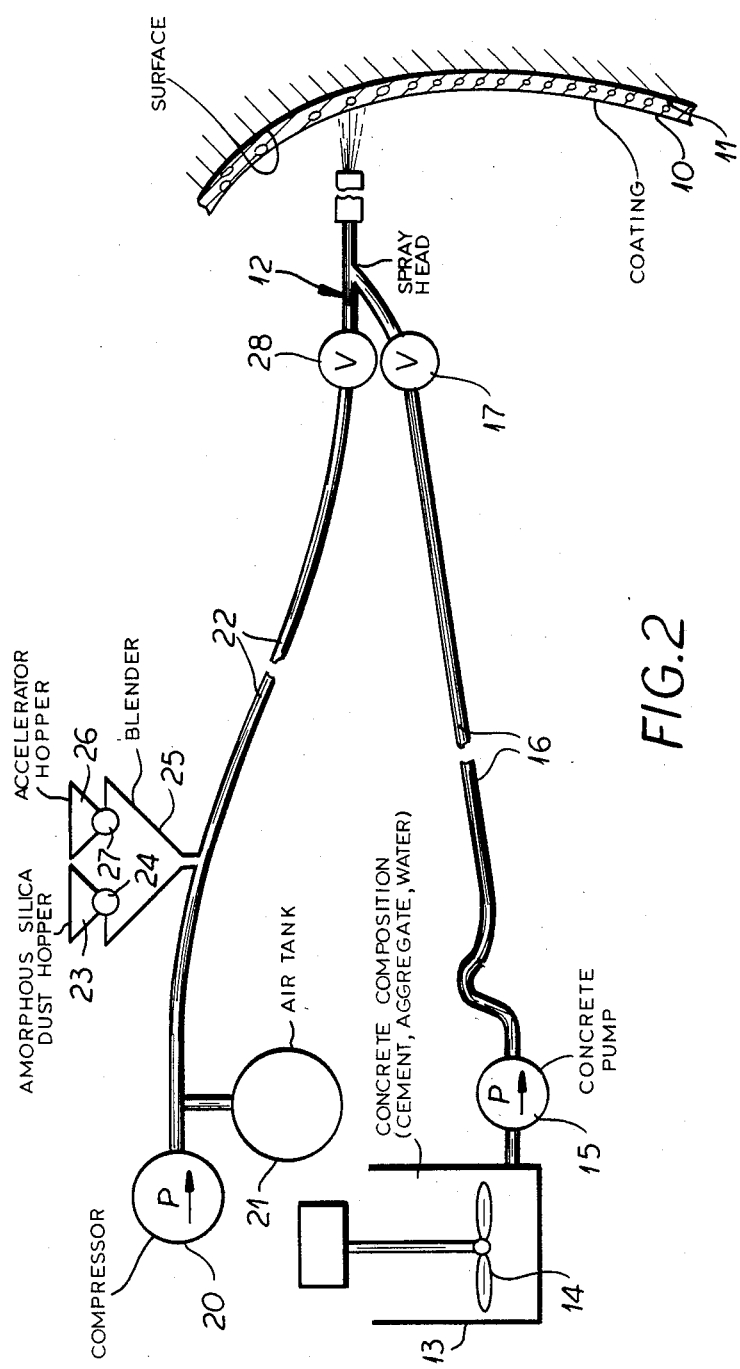
FIG. 2 is a diagram of a concrete spraying apparatus utilizing this spray head.

Referring first to FIG. 2, it can be seen that the basic apparatus for applying a spray concrete coating 10 to a surface 11 can comprise a spray head 12 shown in greater detail in FIG. 1, and the means for supplying this spray head with the respective streams.

In the embodiment shown, a concrete batching vessel 13 serves to form a concrete composition consisting at least of the hydraulic cement, aggregate and water which is kept homogeneous by a mixer diagrammatically represented at 14.

A concrete pump 15 connected to the batching vessel 13 displaces the concrete through the hose 16 and, via a valve 17, to one of the pipes of the spray head, in this case the inclined pipe. The valve 17, however, may alternatively be connected to the straight pipe of the head 12.

The other stream is formed by a compressor 20 which feeds a compressed-air tank 21 to maintain the driving air pressure in a line 22.

To this line, the amorphous silica dust can be supplied from a hopper 23 via a metering outlet 24 opening into a blender 25. A setting accelerator can also be metered into the blender 25 from a hopper 26 via the metering device 27.

The air-entrained silica dust thus passes in a through the hose 22 to the valve 28 and into the spray head 12. The valve 28 can be disconnected from the straight pipe and connected to the inclined pipe of the spray head as desired.

Turning to FIG. 1, it can be seen that the spray head 12 comprises a straight tube or pipe 1 for the silica-dust-laden driving air and an inclined feedpipe or tube 3 to which the spray concrete mixture is fed and which is inclined to the straight pipe at an acute angle a in the direction in which the mixture is sprayed, i.e. the direction of arrow 2. The streams can be interchanged to the two pipes.

The mouth of the spray device 12 is formed by a flexible hose 4 which can be directed as desired toward the wall 11 to be coated with the concrete. This hose serves as a vortex-generating member and, if a stiff elongate structure is substituted for the hose, e.g. to act as a turbulence-inducing lance, the entire head 12 can be moved around to vary the location at which the concrete is sprayed. The straight pipe can be provided with a constriction if desired to form a nozzle for the concrete application to the wall, thereby converting static pressure into kinetic energy. The device illustrated in FIG. 1 has been found to be suitable for the air-driving pressure in excess of 5 bar, e.g. a driving pressure of about 8 bar. By way of example, the feedpipe 3 and the straight pipe 1 can have internal diameters D of about 50 mm and the angle can be about 30°.

We claim:

1. A method of applying spray concrete to a surface to be concreted, comprising the steps of:

(a) forming a pumpable and sprayable settable concrete composition consisting at least of a hydraulic cement, an aggregate and water;
    (b) entraining said composition in a stream of driving air at a driving pressure to form a spray of said composition and cause particles of said spray to deposit on said surface to be conceted and set as a layer of concrete thereon; and
    (c) admixing with said air before it entrains said composition a quantity of silica dust having an inner surface area of substantially 200 to 700 m$^2$/g and sufficient to interact with said composition upon contact therewith and spontaneously raises the temperature thereof by substantially 5 to 10 degrees Kelvin and thereby accelerate the setting of said concrete on said surface.

2. The method defined in claim 1 wherein said silica dust and said concrete setting accelerator substance form a mixture, said substance being supplied to said mixture so as to constitute 25 to 40% by weight thereof.

3. The method defined in claim 1 wherein said silica dust is admixed with said driving air in an amount such that the silica dust is present in an amount of 2 to 6% by weight of the cement in said composition upon the spraying thereof.

4. The method defined in claim 3 wherein said amount of the silica dust is about 4% by weight of the cement in said composition upon the spraying thereof.

5. The method defined in claim 1 wherein said silica dust is admixed with said driving air while it is under said driving pressure.

6. The method defined in claim 1 wherein said silica dust has a specific surface area of substantially 200 to 300 m$^2$/g.

7. The method defined in claim 1, further comprising the step of admixing a concrete setting accelerator substance with said silica dust before said silica dust is added to said driving air.

8. The method defined in claim 1 wherein said composition consists of substantially 300 kg/m$^3$ cement, substantially 80 kg/m$^3$ flyash, 1600 kg/m$^3$ aggregate, and 200 kg/m$^3$ water.

9. The method defined in claim 8 wherein said cement is portland cement.

* * * * *